United States Patent
Tartler

(10) Patent No.: US 9,435,673 B2
(45) Date of Patent: Sep. 6, 2016

(54) DEVICE FOR METERING OF A FLUID VOLUMETRIC FLOW OF A LIQUID COMPONENT IN A MIXER FEED LINE FOR MIXING PLASTICS

(71) Applicant: Udo Tartler, Lützelbach/Haingrund (DE)

(72) Inventor: Udo Tartler, Lützelbach/Haingrund (DE)

(73) Assignee: Udo Tartler, Lüzelbach/Haingrund (DE)

( * ) Notice: Subject to any disclaimer, the term of this patent is extended or adjusted under 35 U.S.C. 154(b) by 0 days.

(21) Appl. No.: 14/476,418

(22) Filed: Sep. 3, 2014

(65) Prior Publication Data

US 2015/0059493 A1    Mar. 5, 2015

(30) Foreign Application Priority Data

Sep. 3, 2013   (DE) .......................... 10 2013 014 537

(51) Int. Cl.
| | |
|---|---|
| *G01F 1/00* | (2006.01) |
| *G01F 1/46* | (2006.01) |
| *B29B 7/76* | (2006.01) |
| *G01F 1/05* | (2006.01) |
| *B29C 67/24* | (2006.01) |

(52) U.S. Cl.
CPC ............... *G01F 1/46* (2013.01); *B29B 7/7615* (2013.01); *G01F 1/05* (2013.01); *B29B 7/7694* (2013.01); *B29C 67/246* (2013.01)

(58) Field of Classification Search
None
See application file for complete search history.

(56) References Cited

U.S. PATENT DOCUMENTS

| | | | |
|---|---|---|---|
| 4,050,896 | A | 9/1977 | Raffel et al. |
| 4,195,527 | A | 4/1980 | Ebeling et al. |
| 4,199,303 | A | 4/1980 | Gusmer et al. |
| 4,288,230 | A | 9/1981 | Ebeling et al. |
| 4,774,059 | A | 9/1988 | Wagner |
| 7,399,437 | B2 | 7/2008 | James et al. |

FOREIGN PATENT DOCUMENTS

| | | |
|---|---|---|
| DE | 2543302 | 4/1977 |
| DE | 2725132 | 12/1977 |
| DE | 3240296 | 5/1984 |
| DE | 10-2006-015768 | 10/2006 |
| EP | 025844 | 4/1981 |
| WO | WO-2011-066095 | 6/2011 |

*Primary Examiner* — Harshad R Patel
(74) *Attorney, Agent, or Firm* — White & Case LLP

(57) ABSTRACT

According to the invention a device for precise metering of a fluid volumetric flow of low flow rates down to zero volumetric flow of a liquid component in a mixer feed line for mixing plastics is provided, the device having a fluid supply tank that is in fluid line communication with the mixer feed line via a pump and through a volumetric flow meter, is characterized in that a fluid return line, which leads back into the tank through a second volumetric flow meter and which branches off from one of the fluid lines between the tank and the mixer feed line downstream of the first volumetric flow meter through a distributor apparatus that has one input and two outputs, namely one into the return line and one into the mixer feed line, and that distributes an input volumetric flow into the two outputs, and specifically in an adjustable fluid rate ratio.

8 Claims, 3 Drawing Sheets

Figure 1:
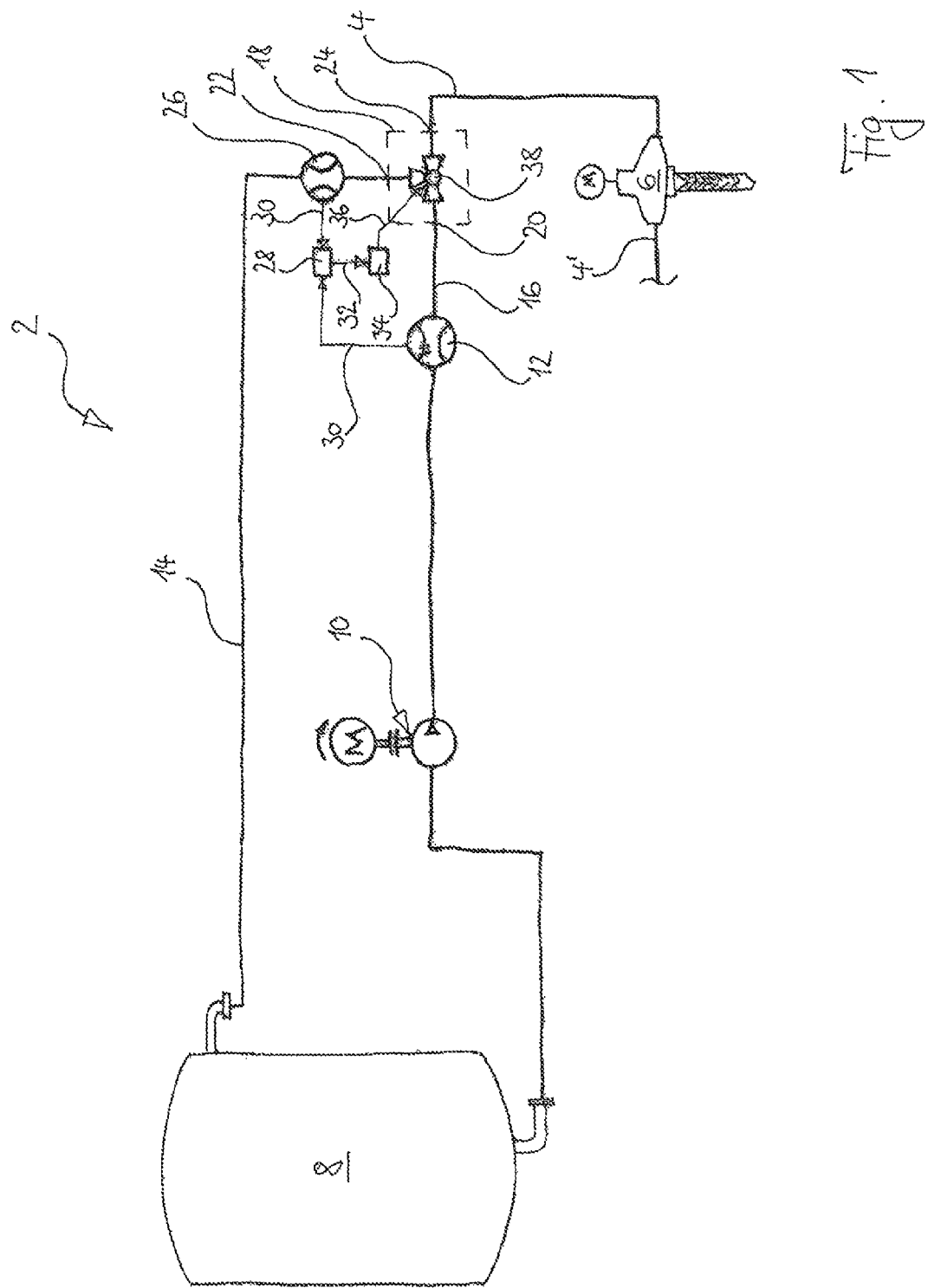

DEVICE FOR METERING OF A FLUID VOLUMETRIC FLOW OF A LIQUID COMPONENT IN A MIXER FEED LINE FOR MIXING PLASTICS

The present invention relates to a device for precise metering of a fluid volumetric flow, even with low flow rates down to zero volumetric flow, of a liquid component in a mixer feed line for mixing plastics, wherein the device has a fluid supply tank that is in fluid line communication with the mixer feed line via a pump and through a volumetric flow meter.

For producing plastic (for example before the introduction into the sprue of a casting mold, or for example during production of large-area plastic parts, for instance in body construction or during construction of vanes), with some plastics at least two liquid components are mixed together such that the resulting liquid, also pasty, mixture cross-links and "hardens". The introduction into the casting mold, or for example also the insertion in a fiber mat or fiber fabric for producing glass fiber or carbon fiber reinforced plastics occurs generally through a tubular conduit (mixer) with form elements (whirling elements) in the interior thereof that repeatedly deflect and divert the flowing fluid, locally back up, and create and/or swirl turbulences, and thus mix it. As is known, feed lines, in particular the number of which equals the number of fluid components from which the plastic is to be mixed, lead into this mixer. This guarantees the mixing of components as late as possible, for example, just before the introduction into the casting mold or the application on, or introduction into the mat or web, for example, in order to keep the rheological properties of the plastic for as long as possible before the hardening thereof for the above mentioned forming.

In a few applications of producing plastics from at least two components in a mixer, it is necessary (along with the precise metering of the mixing ratio of the at least two components to each other, thus the precise metering of the volumetric flow of all participating components), to maintain this precise metering ratio even with very low delivery rates of the (still liquid) plastic mixture from the mixer. For instance, with CNC-controlled surface applications, this can be necessary in specific regions of the surface to be laminated when only very little material is necessary.

In the case of delivery rates below a specific rate, conventional gear metering pumps and volume or mass meters have proven to be imprecise with respect to the flow rate of the conveyed volumetric flow. This can have the disadvantageous consequence of an incorrect component mixture ratio and can lead for example to inferior material properties and material inhomogeneities.

The object of the present invention is to create a device for precise metering of a fluid volumetric flow rate, even of the lowest flow rate, in a fluid metering line, the accuracy and controllability of which is improved for any flow rate down to a stop of the volumetric flow.

The object is solved by a device with the features of claim 1. Preferred developments are stated in the dependent claims.

A device according to the invention serves for precisely metering a fluid volumetric flow, which in particular is to be regulated to zero, in a fluid metering line and particularly preferably for precisely metering a liquid volumetric flow also of relatively large flow rates, which are to be metered toward zero, of a liquid component in a mixer feed line for mixing plastic. The device according to the invention has a fluid supply tank that has a fluid line connection to the mixer feed line via a pump and through a volumetric flow meter. In the case of delivery rates below a specific rate however, as mentioned previously, this known arrangement is imprecise because, in particular, the pump and/or the measuring cell (the sensor for "measuring the flow", in particular a volumetric flow meter for example, but also a mass flow meter or helical screw sensor) in the case of very low delivery rates can no longer provide sufficiently precise information, in order to still sufficiently precisely regulate the volumetric flow. Thus, this relates to the flow rate of the conveyed volumetric flow, which can have the disadvantageous consequence of an incorrect component mixture ratio and lead for example to inferior material properties and material inhomogeneities of the thusly mixed plastic, or even to the complete stoppage of the plastic mixing production, for instance because the (very low) delivery rate lies so close to zero within the tolerance of the delivery accuracy of the pump, the volumetric flow meter, the measuring cell, the mass flow meter and/or the control and regulation thereof, that the system can actually no longer pump and/or regulate.

Therefore, according to the invention, there is a fluid return line in the device that branches off from one of the fluid lines (between the tank and the mixer feed line) downstream of ("behind") the first volumetric flow meter, and leads back into the tank.

The branching off occurs in a distributor apparatus, which has one input (as a run-in of the fluid line coming from the tank and preferably also from the metering pump arranged there) and two outputs (one into the return line and one into the mixer feed line). This distributor apparatus distributes the volumetric flow (the input volumetric flow of the distributor apparatus) conveyed out of the tank by the pump to the two outputs of the distributor apparatus, and specifically in a flow rate ratio that is adjustable as precisely as possible.

The control of the branching off according to the invention is preferably as follows: the distribution of the flow rates into the two outputs occurs only when the throughflow rate through the volumetric flow meter in the fluid line connection between the tank and the mixer feed line has reached the minimum thereof, thus the flow rate is still to be precisely regulated by the meter. Then, the distributor apparatus can be controlled and regulated via a second volumetric flow meter.

For example, the fluid return line additionally has a second volumetric flow meter. If now only a very low volumetric flow is required in the mixer feed line, the pump, which is technically capable to constantly and/or precisely convey according to the technical specification thereof, can according to the invention still convey a significantly larger volumetric flow from the tank through the first volumetric flow meter into the input of the distributor apparatus. This volumetric flow can be read at the first volumetric flow meter. In that a volumetric flow is branched off at the distributor apparatus into the return line (leading back to the tank) that is nearly as large as the volumetric flow through the first volumetric flow meter (this "return volumetric flow" can be read at the second volumetric flow meter in the return line), and in that this difference (which for all intents and purposes according to the invention, is possibly very small) between volumetric flow conveyed through the first volumetric flow meter and the volumetric flow branched off into the return line, can be precisely adjusted at the distributor apparatus, this results in a very precise—possibly very small—volumetric flow difference, as a resulting—possibly very small, even if requested (because a particular ratio of components and process require it) possibly a completely stopped—volumetric flow according to the invention in the mixer feed line.

The device preferably has a signal processing apparatus, which calculates a difference signal from the signals of the two volumetric flow meters, and a control apparatus, which depending on the difference signal adjusts the flow rate ratio at the distributor apparatus. The method described above can be thusly controlled or regulated automatically.

As a particularly preferred embodiment, a third volumetric flow meter is arranged in the fluid line leading from the distributor apparatus to the mixer. This allows to exactly adjust and measure the flow rate in the mixer feed line between 100% of the capacity of the pump to low flow rates like 1%, 0.1% of the capacity and standstill, while possibly keeping the pump adjusted to one single certain feed rate (the highest required in a mixing process, e.g.—it may be verified, also controlled, by means of the first volumetric flow meter). Then, the respective flow rate presently required in the mixer feed line can be dosed by adjusting, in particular controlling, only the distributor apparatus (and thanks to the third meter already at high flow rates required in the mixer feed line)—verified, in particular controlled, by means of the second and third volumetric flow meter. Herein, the measurements of the second and third volumetric flow meter can be used both (averaged, e.g.) to form basis for the adjustment of the distributor apparatus as long as "the sum verification is correct": namely, the sum of the flow rates measured in the second and third volumetric flow meter equals the flow rates measured in the first flow meter (because the sum of the amounts flowing out of the distributor apparatus must be equal to the amount flowing in—accordingly, all three volumetric flow meters can be calibrated, also against each other, prior to beginning of the process, e.g.). But as soon as the sum of the measurements of the second and the third meter deviates from the measurement in the first meter, this means (at calibrated meters, as said) that measurement of one of the two meters now has become imprecise, in other words, flow through one of the two meters (the second or the third) has become too low to be measured exactly—the flow passing through this meter now lies below its minimal flow rate, consequently out of, namely below, its range of tolerance. This volumetric flow meter will now be ignored for the adjustment, in particular the controlling, of the distributor apparatus until the sum verification is correct again.

For example: as long as a high flow rate is required to reach the mixer feed line (at the beginning of a mixing process, e.g.), only a small portion of the flow transported by the pump will be—adjusted, in particular controlled, by means of the distributor apparatus—deviated through the fluid return line (directed back into the tank). If the whole flow transported by the pump is required to reach the mixer feed line, nothing will be directed through the fluid return line back into the tank. In either of these statuses, measurement of the second volumetric flow meter (in the fluid return line) can then be ignored, for the flow rate here then presumably lies, as described, below the tolerance of the second volumetric flow meter (visible from the sum verification—and preferably programmed accordingly, like potentially every single context here, in an according control circuit). As soon as the sum verification is correct again—as soon as a flow is directed through both the fluid return line and the mixer feed line at a rate high enough to be inside the range of tolerance of the second and third meter—neither of the two meters needs to be ignored anymore. This is, understandably, the status at medium level flow rates in the mixer feed line, when, consequently, not the full or not almost the full amount of flow transported by the pump is required to reach the mixer feed line, but when, instead, a volume flow (exactly measurable by means of the third meter) is directed through the mixer feed line and, at the same time, a volume flow (exactly measurable by means of the second meter) is directed through the fluid return line. As soon as finally a status is required with low or very low flow rates in the mixer feed line, when, consequently, almost the full amount of flow transported by the pump is required to be returned into the tank through the fluid return line, the third meter (in the mixer feed line comprising now hardly any flow, as said) can be ignored (visible from the sum verification) for the adjustment of the distributor apparatus, and the adjustment of the distributor apparatus can be based only on the second meter in the fluid return line.

The distributor apparatus can be a distributor ball valve, (that is to say as a controllable volumetric flow switch) which by rotation of a shut-off ball having a rotatable throughflow hole reduces the flow cross-section and/or flow resistance and thus the flow rate in the outlet thereof, to the same degree as it increases in the other outlet thereof. The same effect according to the invention can be obtained also using a pilot valve and/or slide valve. In principle, any technical designs of adjustable, in particular, controllable fluid lines-distributor switches are suitable.

As an alternative to this specialized armature, the distributor apparatus can also have a simple (typically possibly free of pressure loss) line branching, which leads into two metering ball valves or adjustable throttles each having adjustable output flow rates. The flow rate ratio can be adjusted at a coupling apparatus, in that the coupling apparatus reduces the output flow rate at one of the two metering ball valves, or respectively at one of the two throttles, by the same amount by which it increases the output flow rate at the other of the two metering ball valves. This can occur mechanically, in that the coupling apparatus actuates the two metering ball valves in opposite directions for example, using a mechanical gear mechanism, in particular having a linkage. However, an electromechanical coupling apparatus for instance with oppositely controlled actuators of the two metering ball valves, or respectively the two throttles, is also possible according to the invention.

Figure 2:
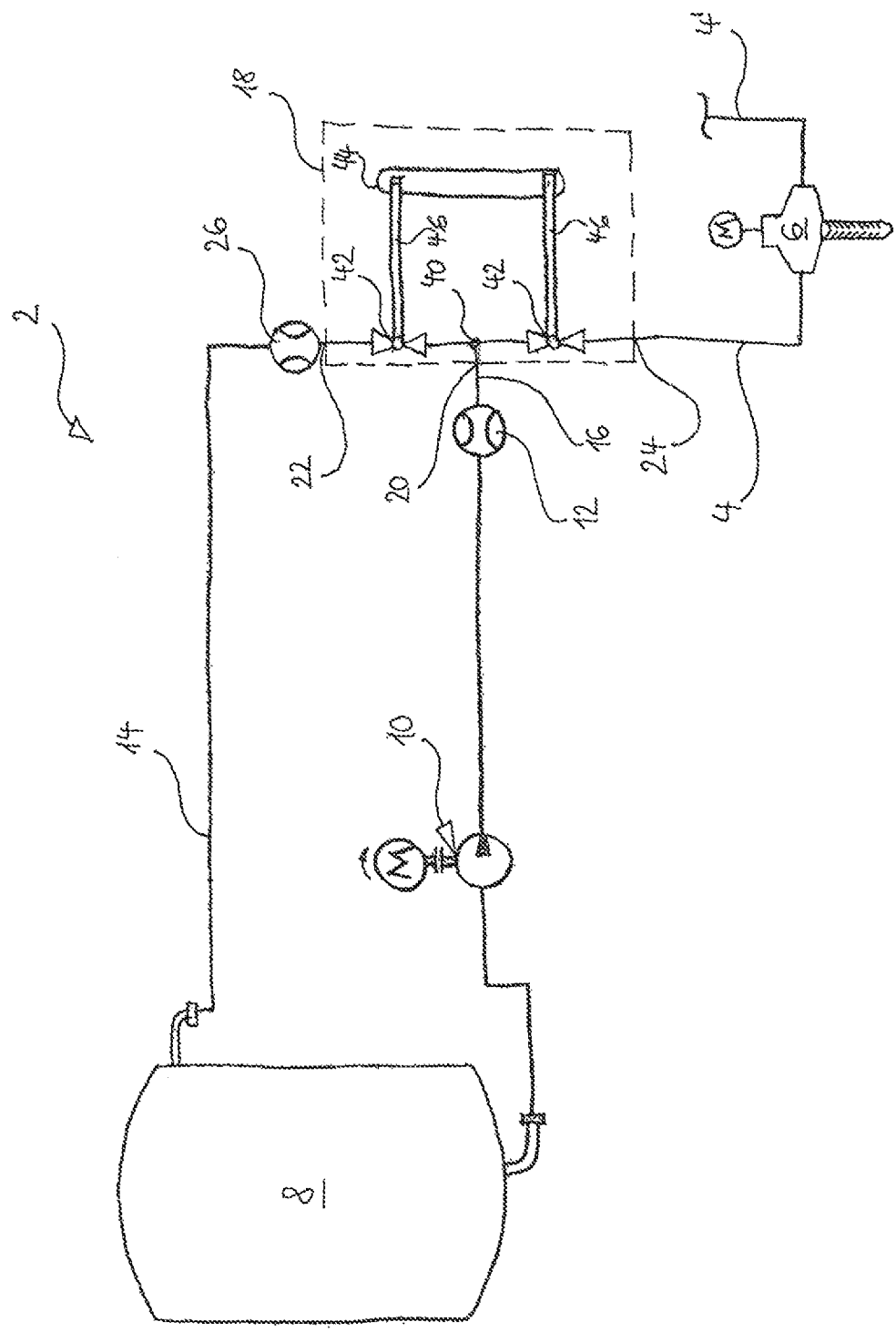
Figure 3:
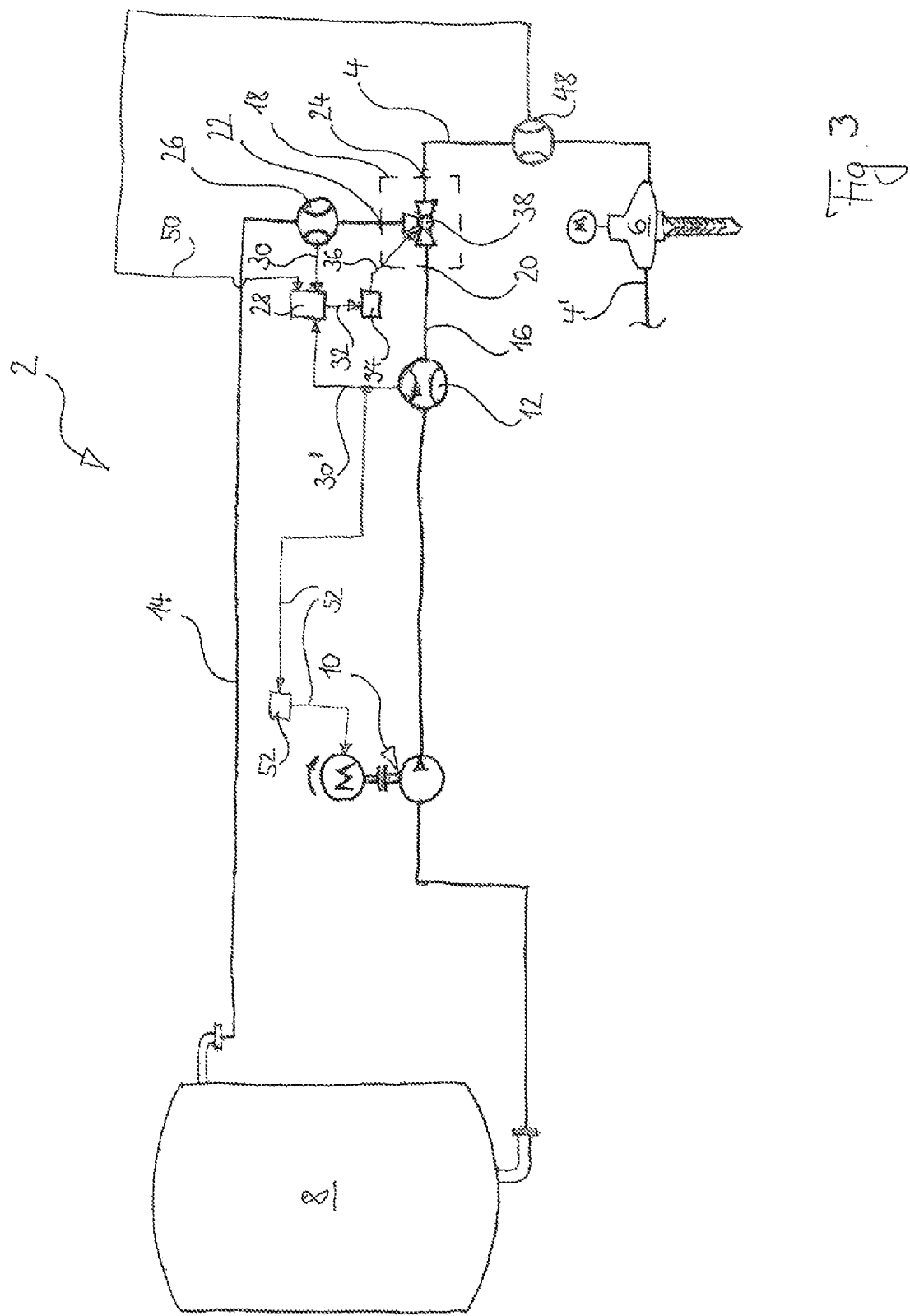

These and further advantages and features of the invention are described in greater detail with reference to the following drawings of example embodiments of the invention. The drawings show in:

FIG. 1 a schematic flow diagram of a device according to the invention for precise metering of a fluid volumetric flow of low flow rate in a plastic mixer feed line, in FIG. 2 a schematic flow diagram of an alternative design of a device according to the invention for precise metering of a fluid volumetric flow of low flow rate in a plastic mixer feed line, and in FIG. 3 a schematic flow diagram of another alternative design of a device according to the invention for precise metering of a fluid volumetric flow of low flow rate in a plastic mixer feed line.

According to FIGS. 1 and 2, a device 2 serves for precisely metering a fluid volumetric flow from very large rates (for example of approximately 20 l/min) to a complete stop of the flow rate in a mixer feed line 4 (of several 4, 4'), through each of which a plastic liquid component is to be conveyed in very low volumetric flows to a plastic mixer 6. The device 2 has a fluid supply tank 8 that is in fluid line communication with the mixer feed line 4 via a pump 10 and through a first volumetric flow meter 12. This—insofar as—known arrangement however, as mentioned previously, in the case of delivery rates below a specific rate, is imprecise with respect to the flow rate of the conveyed volumetric flow, which can have the disadvantageous consequence of an incorrect component mixture ratio in the mixer 6, and lead for example to inferior material properties and material inhomogeneities of the thusly mixed plastic (not shown), or even lead to the complete stoppage of the plastic mixing production, for instance because the (very low) delivery rate lies so close to zero within the tolerance of the delivery accuracy of the pump 10 or of the volumetric flow meter 12 and/or the control and regulation thereof, that a—only thusly arranged—system can actually no longer even pump.

Therefore, according to the invention, there is a fluid return line 14 in the device 2 that branches off from the fluid line 16 (between the tank 8 and the mixer feed line 4) downstream of ("behind the") the first volumetric flow meter 12, and leads back into the tank 8.

The branching occurs in a distributor apparatus 18, which has one input 20 (as a run-in of the fluid line 16 coming from the tank 8) and two outputs 22, 24 (one output 22 into the return line 14 and one output 24 into the mixer feed line 4). This distributor apparatus 18 distributes the volumetric flow (the volumetric flow at the input 20 of the distributor apparatus 18) conveyed out of the tank 8 by the pump 10 to the two outputs 22, 24 of the distributor apparatus 18, and specifically in a flow rate ratio that is adjustable as precisely as possible.

The fluid return line 14 additionally has a second (very precise) volumetric flow meter 26. If now only a very low volumetric flow (or at least a volumetric flow that is so much lower that the conventional system having tank, pump, and measuring cell/volumetric flow meter/mass flow meter or other measurement apparatus can no longer pump precisely) is required in the mixer feed line 4, the pump 10, which is technically capable to constantly and/or precisely convey according to the technical specification thereof, can convey a (still significantly larger) volumetric flow from the tank 8 through the first volumetric flow meter 12 into the input 20 of the distributor apparatus 18. This (still significantly larger) volumetric flow can be measured at the first volumetric flow meter 12. In that now (for example shortly before falling below the delivery accuracy of the system without the return line according to the invention) a volumetric flow is branched off at the distributor apparatus 18 into the return line 14 (leading back to the tank 8) that can also be exactly as large as the volumetric flow through the first volumetric flow meter 12 (this "return volumetric flow" can be measured at the second volumetric flow meter 26 in the return line 14), and in that this difference (which for all intents and purposes according to the invention, possibly very small) between the volumetric flow conveyed through the first volumetric flow meter 12 and the volumetric flow branched off into the return line 14, can be precisely adjusted at the distributor apparatus 18, this results in a very precise—possibly very small—volumetric flow difference, as a resulting—possibly very small—volumetric flow according to the invention in the mixer feed line 4.

The device 2 preferably has a signal processing apparatus 28, which calculates a difference signal 32 from signals 30 of the two volumetric flow meters 12, 26, and a control apparatus 34, which depending on this difference signal 32 sends a corrective signal 36 to the distributor apparatus 18, in order to adjust the volumetric flow ratio. The method described above can be thusly controlled or regulated automatically.

The distributor apparatus 18 can, according to FIGS. 1 and 3, be a distributor ball valve 38 (or also a pilot valve and/or slide valve), which (that is to say as a controllable volumetric flow switch) by rotation of a shut-off ball (not shown) having a rotatable throughflow hole (not shown) (or also by moving a slide or stem; not shown) reduces the flow cross-section and/or flow resistance and thus the flow rate in the one outlet 22, 24 thereof to the same quantity as it increases in the other outlet 22, 24 thereof.

As an alternative to this specialized armature 38, the distributor apparatus 18 can have, like it is shown in FIG. 2, a simple (typically possibly free of pressure loss) line branching 40, which leads to two metering ball valves 42 each having adjustable output flow rates. The flow rate ratio can be adjusted at a coupling apparatus 44, in that the coupling apparatus 44 mechanically reduces the output flow rate at one of the two metering ball valves 42, by the same amount by which it increases the output flow rate at the other of the two metering ball valves 42. This occurs mechanically, in that the coupling apparatus 44 actuates the two metering ball valves 42 in opposite directions using a mechanical gear mechanism having a linkage 46.

As an embodiment according to FIG. 3, a third volumetric flow meter 48 is arranged in the fluid line 4 leading from the distributor apparatus 18 to the mixer 6. This allows to exactly adjust and measure the flow rate in the mixer feed line 4 between 100% of the capacity of the pump 10 to low flow rates like 1%, 0.1% of the capacity and standstill, while possibly keeping the pump 10 adjusted to one single certain feed rate (the highest required in a mixing process, e.g.—it may be verified, also controlled, by means of the first volumetric flow meter 12 through a data line 52 and a control device 54). Then, the respective flow rate presently required in the mixer feed line 4 can be dosed by adjusting, in particular controlling, only the distributor apparatus 18 (and thanks to the third meter 48 already at high flow rates required in the mixer feed line 4)—verified, in particular controlled by means of the control apparatus 34, by means of the second and third volumetric flow meter 26, 48. Herein, the measurements of the second volumetric flow meter 26 and the measurements of the third volumetric flow meter 48 can be used both (averaged in the signal processing apparatus 28, e.g.) to form basis for the adjustment of the distributor apparatus 18 as long as "the sum verification is correct": namely, the sum of the flow rates measured in the second volumetric flow meter 26 and the flow rates measured in third volumetric flow meter 48 equals the flow rates measured in the first flow meter 12 (because the sum of the volume flows flowing out of the distributor apparatus 18 must be equal to the volume flow flowing in—accordingly, also to this criterion, all three volumetric flow meters 12, 26, 48 can be calibrated, also against each other, prior to beginning of the process, e.g.). But as soon as the sum of the measurements of the second and the third meter 26, 48 deviates from the measurement in the first meter 12, this means (at calibrated meters, as said) that measurement of one of the two meters 26, 48 now has become imprecise, in other words, flow through one of the two meters (the second or the third) has become too low to be measured exactly—the flow passing through this meter 26, 48 now lies below its minimal flow rate, consequently out of, namely below, its range of tolerance. This volumetric flow meter will now be ignored for the adjustment, in particular the controlling, of the distributor apparatus 18 until the sum verification is correct again.

For example: as long as a high flow rate is required to reach the mixer feed line 4 (at the beginning of a mixing process, e.g.), only a small portion of the flow transported by the pump 10 will be—adjusted, in particular controlled by means of the control apparatus 34, by means of the distributor apparatus 18—deviated through the fluid return line 14 (directed back into the tank 8). If the whole flow transported by the pump 10 is required to reach the mixer feed line 4, nothing will be directed through the fluid return line 14 back into the tank 8. In either of these statuses, measurement of the second volumetric flow meter 26 (in the fluid return line 14) can then be ignored, for the flow rate here then presumably lies, as described, below the tolerance of the second volumetric flow meter 26 (visible from the sum verification—and programmed accordingly in an according control circuit). As soon as the sum verification is correct again—as soon as a flow is directed through both the fluid return line 14 and the mixer feed line 4 at a rate high enough to be inside the range of tolerance of the second and third meter 26, 48—neither of the two meters needs to be ignored anymore. This is, understandably, the status at medium level flow rates in the mixer feed line 4, when, consequently, not the full or not almost the full amount of flow transported by the pump 10 is required to reach the mixer feed line 4, but when, instead, a volume flow (exactly measurable by means of the third meter 48) is directed through the mixer feed line 4 and, at the same time, a volume flow (exactly measurable by means of the second meter 26) is directed through the fluid return line 14. As soon as finally a status is required with low or very low flow rates in the mixer feed line 4, when, consequently, almost the full amount of flow transported by the pump 10 is required to be returned into the tank 8 through the fluid return line 14, the third meter 48 (in the mixer feed line 4 comprising now hardly any—but exactly this very low required—flow, as said) can be ignored (visible from the sum verification) for the adjustment of the distributor apparatus 18, and the adjustment of the distributor apparatus 18 can be based only on the second meter 26 in the fluid return line 14.

What is claimed is:

1. A device for precisely metering a fluid volumetric flow of a liquid component in a mixer feed line (4) for mixing plastics, the device comprising:
    a fluid supply tank (8) that has a fluid line connection to the mixer feed line (4) via a pump (10) and through a first volumetric flow meter (12),
    a fluid return line which leads back through a second volumetric flow meter (26) into the tank (8) and which branches off from one of the fluid lines (16) between the tank and the mixer feed line downstream of the first volumetric flow meter through a distributor apparatus (18) that has one inlet (20) and two outlets (22,24) and distributes the one inlet volumetric flow into the two outlets (22,24) in a flow-rate ratio that is adjustable;
    a third volumetric flow meter (48) arranged in a fluid line connection downstream of the outlet of the distributor apparatus (18) into the mixer feed line (4); and
    a control apparatus which controls or regulates the flow rate ratio at the distributor apparatus (18) by reducing the flow rate in one outlet (22,24) thereof to the same degree as it increases in the other outlet (22,24) thereof depending on signals of at least one of the volumetric flow meters (12,48).

2. The device according to claim 1, further comprising a signal processing apparatus that calculates a difference signal (32) from signals of the first and second volumetric flow meters (12,26).

3. The device according to claim 1 or 2, wherein the control apparatus controls or regulates the flow-rate ratio at the distributor apparatus (18) depending on a difference signal (32) from signals of the first and second volumetric flow meters (12, 26).

4. The device according to claim 1 or 2, wherein the distributor apparatus (18) has a distributor ball valve and/or a slide valve and/or a pilot valve.

5. The device according to claim 1 or 2, wherein the distributor apparatus (18) has a line branching (40), which leads to two metering ball valves (42) each having an adjustable outlet flow rate, and comprises a coupling apparatus (44) at which the flow rate ratio can be adjusted, wherein the coupling apparatus reduces the outlet flow rate at one of the two metering ball valves (42) by the same amount by which it increases the outlet flow rate at the other of the two metering ball valves (42).

6. The device according to claim 5, wherein the coupling apparatus (44) actuates the two metering ball valves (42) using a mechanical gear mechanism having a linkage.

7. The device of claim 1, wherein the device meters low-flow volume down to a complete stop of the volumetric flow of the liquid component.

8. A device for precisely metering a fluid volumetric flow of a liquid component in a mixer feed line (4) for mixing plastics, the device comprising:
    a fluid supply tank (8) that has a fluid line connection to the mixer feed line (4) via a pump (10) and through a volumetric flow meter (12), and
    a fluid return line which leads back through a second volumetric flow meter (26) into the tank (8) and which branches off from one of the fluid lines (16) between the tank and the mixer feed line downstream of the first volumetric flow meter through a distributor apparatus (18) that has one inlet (20) and two outlets (22,24) and distributes the one inlet volumetric flow into the two outlets (22,24) in a flow-rate ratio that is adjustable; and
    wherein the distributor apparatus (18) has a line branching (40) which leads to two metering ball valves (42) each having an adjustable outlet flow rate, and a coupling apparatus (44) at which the flow rate ratio can be adjusted, wherein the coupling apparatus reduces the outlet flow-rate at one of the two metering ball valves (42) by the same amount by which it increases the outlet flow rate at the other of the two metering ball valves (42).

* * * * *